(12) United States Patent
Christensen

(10) Patent No.: US 7,292,530 B2
(45) Date of Patent: Nov. 6, 2007

(54) METHOD AND APPARATUS TO MANAGE PACKET FRAGMENTATION

(75) Inventor: Jacob Christensen, Virum (DK)

(73) Assignee: Intel Corporation, Santa Clara, CA (US)

( * ) Notice: Subject to any disclaimer, the term of this patent is extended or adjusted under 35 U.S.C. 154(b) by 1278 days.

(21) Appl. No.: 09/752,372

(22) Filed: Dec. 29, 2000

(65) Prior Publication Data

US 2002/0136217 A1    Sep. 26, 2002

(51) Int. Cl.
*H04L 12/28* (2006.01)
*H04J 3/16* (2006.01)

(52) U.S. Cl. .................... 370/230.1; 370/468; 370/474

(58) Field of Classification Search ............... 370/352, 370/392, 395.1, 395.43, 465, 468, 470, 473, 370/229, 230, 230.1, 232, 233, 234, 235
See application file for complete search history.

(56) References Cited

U.S. PATENT DOCUMENTS

| 4,771,391 | A | | 9/1988 | Blasbalg | |
|---|---|---|---|---|---|
| 5,497,371 | A | | 3/1996 | Ellis et al. | |
| 5,541,919 | A | * | 7/1996 | Yong et al. | 370/416 |
| 6,243,359 | B1 | * | 6/2001 | Roy et al. | 370/230 |
| 6,370,163 | B1 | * | 4/2002 | Shaffer et al. | 370/519 |
| 6,804,251 | B1 | * | 10/2004 | Limb et al. | 370/444 |
| 6,891,855 | B2 | * | 5/2005 | Bruckman | 370/468 |

FOREIGN PATENT DOCUMENTS

WO        WO 00/20876        4/2000

OTHER PUBLICATIONS

Internet Protocol RFC 791, Sep. 1991.*

* cited by examiner

*Primary Examiner*—Wellington Chin
*Assistant Examiner*—Soon D. Hyun
(74) *Attorney, Agent, or Firm*—Kacvinsky LLC

(57) ABSTRACT

Embodiments of a method and apparatus to improve network performance by managing packet fragmentation are described.

29 Claims, 7 Drawing Sheets

METHOD AND APPARATUS TO MANAGE PACKET FRAGMENTATION

FIELD

This specification relates to communications in general. More particularly, this specification relates to a method and/or apparatus to improve network performance by managing packet fragmentation.

BACKGROUND

Packet fragmentation relates to a communications technology that may reduce the latency for transmitting information across a network, such as when it might be desirable to provide a higher level of service. Conventional packet fragmentation technology, however, may not employ packet fragmentation as effectively as desired. This may be particularly true in view of the dynamic nature of a network environment, where changes in operating conditions may frequently be occurring. Consequently, there is a need to improve the implementation of packet fragmentation in a network to adapt to potential changes in operating conditions, for example.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Figure 1:
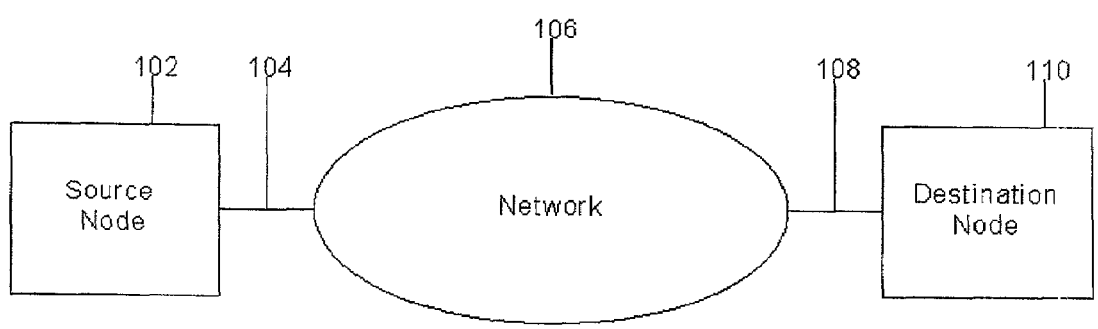
FIG. 1 is a block diagram of a system suitable for practicing one embodiment of the invention.

In the following detailed description, numerous specific details are set forth in order to provide a thorough understanding of the embodiments of the invention. It will be understood by those skilled in the art, however, that embodiments of the invention may be practiced without these specific details. In other instances, well-known methods, procedures, components and circuits have not been described in detail so as not to obscure the foregoing embodiments of the invention.

Embodiments of the invention may improve performance of a communications network, such as a packet switching network. One embodiment of the invention improves performance of a packet switching network by improving management of packet fragmentation. Packet fragmentation in this context refers to breaking a packet of information into a series of packet fragments that are typically smaller than the original packet.

More particularly, the embodiment of the invention automatically manages packet fragmentation in accordance with changing conditions, such as changing priority level, connection speed, and so forth. Consequently, this may improve the overall capacity and performance of a network. Accordingly, users may benefit from faster response times from network applications and services.

Packet switching continues to be an effective technology for voice and data communications. Packet switching in this context may refer to communicating information over a network in the form of relatively short packets. A packet in this context refers to a set of information of a limited length, with the length typically represented in terms of bits or bytes. An example of a packet length might be 1000 bytes. A network typically comprises a number of nodes interconnected by a communications medium. The nodes may be capable of communicating information to other nodes over the communications medium using one or more protocols. A node in this context may include any device capable of communicating information, such as a computer, server, switch, router, bridge, gateway and so forth. A communications medium may be any medium capable of carrying information signals, such as twisted-pair wire, co-axial cable, fiber optics, radio frequencies and so forth. A protocol may comprise a set of instructions by which the information signals are communicated over the communications medium. For example, the protocol might be a packet switching protocol such as the Transmission Control Protocol (TCP) as defined by the Internet Engineering Task Force (IETF) standard 7, Request For Comment (RFC) 793, adopted in September, 1981, and the Internet Protocol (IP) as defined by the IETF standard 5, RFC 791, adopted in September, 1981, both available from "www.ietf.org" ("TCP/IP Specification").

A packet switching network may comprise a source node, a destination node, and a number of intermediate nodes. The source node may comprise a node that originates a set of information for delivery to the destination node. Information may comprise any data capable of being represented as a signal, such as an electrical signal, optical signal, acoustical signal and so forth. Examples of information in this context may include data from a voice conversation, videoconference, streaming video, electronic mail ("email") message, voice mail message, graphics, image, video, text and so forth. The destination node may comprise a node that receives information. The intermediate nodes may comprise nodes that communicate the information from the source node to the destination node.

In operation, the source node may send information to the destination node through one or more intermediate nodes in the form of packets. The source node breaks a set of information into a series of packets. Each packet may contain a portion of the information plus some control information. The control information may assist intermediate nodes in the network to route each packet to the destination node. The source node sends the packets over the network, where an intermediate node receives the packets, stores them briefly, and passes them to the next intermediate node. This continues to occur until the destination node eventually receives the entire series of packets and uses them to reproduce the information from the source node.

Transporting packets through intermediate nodes, however, becomes more complicated if a packet has a higher priority associated with it. Information may be assigned different levels of priority. Information with a higher priority may be given preferential treatment as it passes through the network. An example of higher priority information may include time sensitive information, such as information from a voice message. If packets carrying voice information are delayed in the network, the receiving party may perceive silent periods that exceed the natural pauses and rhythm of a normal telephone conversation, for example. Information that may be less sensitive to time delays in a network, such as an email message or voice message, on the other hand, typically has a lower priority. If packets carrying an email message are delayed, the delay frequently goes unnoticed by the intended recipient, unless excessive. Consequently, intermediate nodes are often capable of determining the priority level of a packet and processing it accordingly. Transporting packets of lower priority may be relatively straightforward since these packets do not require any preferential treatment. Transporting packets of higher priority, however, may employ additional technology to reduce delays in the network. Packet fragmentation is one technique for reducing network delays for higher priority packets.

In one embodiment of the invention, packet fragmentation may refer to breaking a packet of information into a series of packet fragments. Each packet fragment typically has a length smaller than the original packet. A length in this context refers to the number of bits or bytes of information comprising the packet or packet fragment. For example, an original packet might have a length of 1500 bytes while a packet fragment might have a length of 100 bytes. Each packet fragment may contain a portion of the information from the original packet plus a fragment header. A fragment header in this context comprises one or more bits representing control information that may assist another node in reassembling the packet fragments into the original packet.

Packet fragmentation is one technique for reducing network delays for higher priority packets. More particularly, the use of packet fragments permits an intermediate node to communicate packet fragments with a higher priority between packet fragments of lower priority. For example, an intermediate node may receive a first and second packet, with the first packet having a lower priority then the second packet. The first packet may comprise information from an email message, for example. The second packet may comprise information from a voice conversation, for example. The intermediate node may store the first and second packets in a transmit queue. A transmit queue in this context may refer to memory to store packets until ready for transmission by the network device. The transmit queue may be organized as a first-in first-out (FIFO) structure. A FIFO in this context refers to a memory structure that orders packets from most recently stored to least recently stored, and where each packet is retrieved from memory in the order from least recently stored packet to most recently stored packet. For example, a line in a grocery store typically operates as a FIFO, where the first person in line is the next person to be serviced at the register. Consequently, if the first packet is received at the intermediate node prior to the second packet, the intermediate node may store the second packet behind the first packet in the transmit queue. This means that the second packet will not be sent until the first packet is fully transmitted. Transmission of the first packet, however, may introduce a level of delay that may not be tolerated by the second packet. In other words, the transmission of the first packet may take so long that the second packet will not arrive at its destination node within an acceptable time frame. Using packet fragmentation, the intermediate node may be able to insert packet fragments from the second packet between packet fragments from the first packet in the transmit queue, thereby reducing the latency created by the first packet to acceptable levels.

The transmit queue problem described above may be better illustrated by way of example. Assume that the length of the first packet is 1500 bytes. Further, assume that the network device may transmit the first packet over a connection operating at a connection speed of approximately 64 kilobits per second (kbps). Transmission of the first packet would take approximately 200 milliseconds (ms), or approximately 0.13 ms per byte. Assume the second packet comprises information from a voice conversation that can tolerate up to 4 ms of delay. If the second packet is behind the first packet in the transmit queue, the second packet will be delayed for 200 ms while the entire first packet is being transmitted, which is far more than the 4 ms delay tolerance of the second packet. As a result, the second packet will arrive late at the destination node. If the intermediate node employs patent fragmentation, however, the first packet may be broken down into packet fragments with a length smaller than 1500 bytes. For example, the first packet may be broken down into packet fragments of 30 bytes each. Transmission time of a 30 byte packet fragment from the first packet would take approximately 3.99 ms. Consequently, the intermediate node may interrupt transmission of the first packet after a packet fragment for the first packet has been fully transmitted, thereby reducing transmission delay for the second packet to below 4 ms.

Conventional implementations of packet fragmentation, however, are unsatisfactory for a number of reasons. For example, packet fragmentation introduces additional delay in the system due to additional overhead in the form of fragmentation headers. This delay may be acceptable in order to reduce the transmit queue delay problem described above when a network device is transporting packets having a higher priority. If the network device is transporting packets having a lower priority, however, this additional delay may be incurred unnecessarily. In another example, packet fragment size is typically dependent upon connection speed and priority level of the packets. If the connection speed or priority level changes, however, the packet fragment size may no longer be appropriate in view of the changes. Embodiments of the invention, as described in more detail hereinafter, may reduce these problems by dynamically managing packet fragmentation in accordance with changing conditions, such as priority level, connection speed and so forth.

For example, one embodiment of the invention may automatically adjust an operating status for packet fragmentation in accordance with changes in operating parameters. The term "operating status" as used herein refers to a state of operation for the packet fragmentation functionality in an intermediate node. Examples of status may include active or de-active, which may refer to turning packet fragmentation functionality on or off, respectively. The term "operating parameters" as used herein refers to operating conditions for packet fragmentation functionality in an intermediate node. Examples of operating parameters might be priority level of information, connection speed, number of packets communicated, and so forth. It can be appreciated that the examples given for operating status and operating parameters are illustrative in nature, and are not meant to limit the scope of the invention herein.

One problem with conventional implementations for packet fragmentation may be that a user manually sets a status for packet fragmentation through a user interface. A user interface in this context refers to a software program that communicates user commands between the user and an operating system (OS) for the intermediate node. An OS in this context refers to software that manages basic functions for a computer platform, such as file management, memory management, input/output (I/O) management, and so forth. If a user wants to change the operating status for packet fragmentation, such as from active to de-active, the user manually accesses the user interface and communicates a status change command to the OS.

By way of contrast, one embodiment of the invention may monitor the network for certain changes in one or more predetermined parameters, and automatically changes the operating status for packet fragmentation accordingly. For example, if the intermediate node detects that only lower priority packets have been received for a certain period of time, this embodiment of the invention may automatically change the status for packet fragmentation from active to de-active. If the intermediate node detects a higher priority packet, this embodiment of the invention may automatically change the status for packet fragmentation from de-active to active. The term "automatically" is used herein to refer to taking action without user intervention.

Another problem with conventional implementations of packet fragmentation is that a user also manually sets a packet fragment size based on a set of assumptions regarding the operating parameters. One example of an operating parameter may include connection speed. Typically, the faster the connection speed, the less time it takes to communicate a packet. A 1500 byte packet may be transmitted faster over a 64 kbps connection then a 32 kbps connection, for example. The less time it takes to communicate a packet, the larger each packet fragment size may be to avoid or at least reduce the transmit queue delay problem described above. Conversely, the more time it takes to communicate a packet, the smaller each packet fragment size may be to avoid the transmit queue delay problem described above. Another operating parameter that may affect packet fragment size is the priority level of the packet. For example, longer packet fragment lengths may be appropriate when packets of lower priority are communicated since lower priority packets may tolerate longer delay times. Shorter packet fragment lengths, however, may be appropriate when packets of higher priority are communicated since higher priority packets may tolerate shorter delay times. Therefore, appropriate packet fragment size may depend upon different operating parameters, such as connection speed and priority level of the information communicated, for example.

Operating parameters, however, may vary over time. For example, connection speed may vary depending on certain conditions such as number of packets communicated, changing physical characteristics of the communication medium, and so forth. Accordingly, if a packet fragment size is selected in accordance with a given connection speed and/or type of information communicated, and one or both change, then the packet fragment size may not provide the desired system performance.

One embodiment of the invention may monitor the network for certain changes in operating parameters, and modify packet fragment size accordingly. This embodiment of the invention, for example, may monitor connection speed and priority levels and automatically vary the packet fragment size accordingly to improve system performance. Having appropriate modifications to packet fragment size as operating parameters change may ensure that the delay introduced due to packet fragmentation is reduced and yet the advantages of packet fragmentation may be realized.

It is worthy to note that any reference in the specification to "one embodiment" or "an embodiment" means in this context that a particular feature, structure, or characteristic described in connection with the embodiment may be included in at least one embodiment of the invention. The appearances of the phrase "in one embodiment" in various places in the specification do not necessarily all refer to the same embodiment.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a source node 102 connected to a destination node 110 via a network 106. Source node 102 is connected to network 106 by connection 104. Destination node 110 is connected to network 106 by connection 108. Although FIG. 1 shows only one source node and one destination node, it can be appreciated that any number of source and destination nodes may be used in system 100 and still fall within the scope of the invention. Furthermore, the terms "connection" and "interconnection," and variations thereof, in this context may refer to physical connections and/or logical connections.

Figure 2:
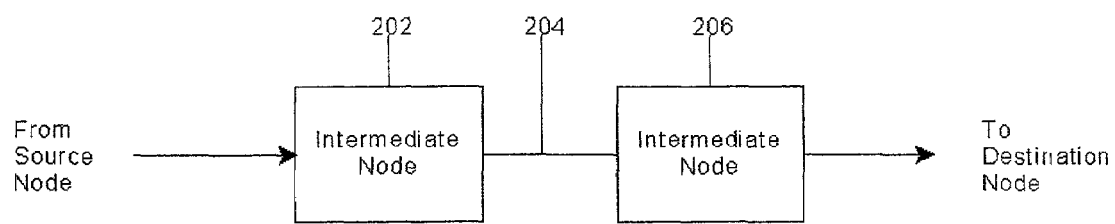
FIG. 2 is a block diagram of a network in accordance with one embodiment of the invention.

FIG. 2 is a block diagram of a network in accordance with one embodiment of the invention. FIG. 2 illustrates a network 200 that may be representative of network 106. Network 200 comprises an intermediate node 202 connected to an intermediate node 206 over a connection 204. Intermediate node 202 may, for example, receive signals from a source node, such as source node 102. Intermediate node 206 may send signals to a destination node, such as destination node 110. Although there are only two intermediate nodes shown in FIG. 2, it can be appreciated that any number of intermediate nodes may be used in network 200 and still fall within the scope of the invention.

Figure 3:
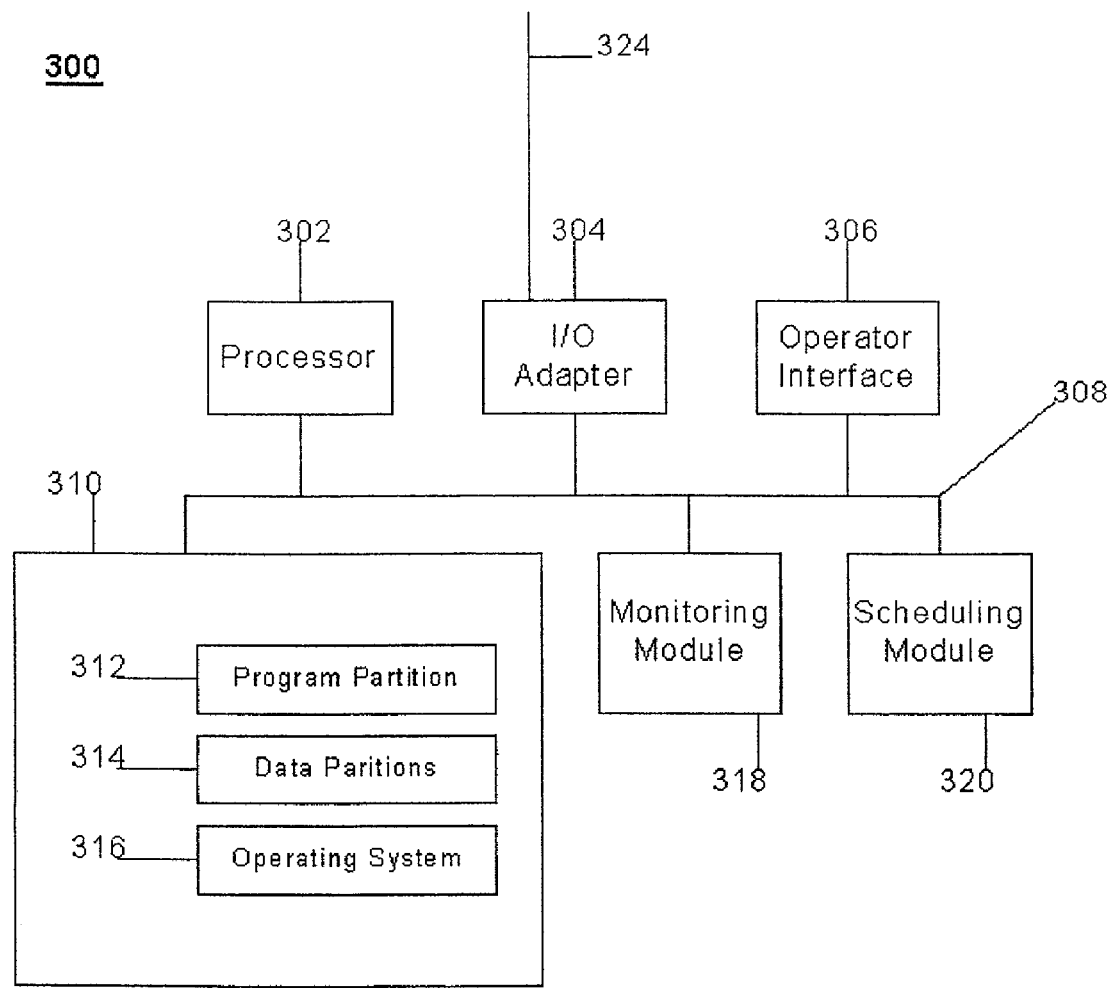
FIG. 3 is a block diagram of a node in accordance with one embodiment of the invention.

FIG. 3 is a block diagram of a node in accordance with one embodiment of the invention. FIG. 3 illustrates a node 300 that may be representative of an intermediate node such as intermediate nodes 202 and 206. Node 300 may comprise a computer platform, such as a personal computer or server. In this embodiment of the invention, node 300 comprises a processor 302, an input/output (I/O) adapter 304, an operator interface 306, a memory 310, a monitoring module 318 and a scheduling module 320. Memory 310 may store computer program instructions and data. Processor 302 may execute the program instructions, and process the data, stored in memory 310. I/O adapter 304 may communicate with other devices and transfer data in and out of intermediate node 300 over connection 324. Operator interface 306 may provide an interface between a user and OS 316. Operator interface 306 may communicate commands between the user and OS 316, and provides status information to the user. Scheduling module 320 may be configured to maintain a current time and date. All these elements are interconnected by bus 308, which allows data to be intercommunicated between the elements. I/O adapter 304 may represent one or more I/O adapters or network interfaces that can connect to local or wide area networks such as, for example, network 200. Therefore, connection 324 may represent a connection to a network or a direct connection to other equipment. It can be appreciated that node 300 may have any number of I/O adapters and connections, such as I/O adapter 304 and connection 324, and still fall within the scope of the invention.

Processor 302 can be any type of processor capable of providing the speed and functionality desired to implement embodiments of the invention. For example, processor 302 may be a processor from a family of processors made by Intel Corporation, Motorola, Compaq, AMD Corporation and Sun Microsystems. In one embodiment of the invention, processor 302 may be a network processor, such as the 1960 network processor made by Intel Corporation.

Memory 310 may comprise any media capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM) and any other device or signal that can store digital information. In one embodiment, the instructions may be stored on the medium in a compressed and/or encrypted format. As used herein, the phrase "adapted to be executed by a processor" is meant to encompass instructions stored in a compressed and/or encrypted format, as well as instructions that may be compiled or installed by an installer before being executed by the processor. Further, node 300 may contain various combinations of machine-readable storage devices through other I/O controllers, which are accessible by processor 302 and which are capable of storing a combination of computer program instructions and data.

In one embodiment of the invention, memory 310 comprises an operating system 316, a program partition 312 and a data partition 314. Program partition 312 may store and allow execution by processor 302 of program instructions that implement the functions of each respective node described herein, such as source node 102, destination node 110, intermediate node 202 and intermediate node 206. Data partition 314 may store data to be used during the execution of program instructions.

I/O adapter 304 may be a network interface that may comprise any suitable technology for controlling communication signals between network devices using a desired set of communications protocols, services and operating procedures. In one embodiment of the invention, I/O adapter 304 operates in accordance with the TCP/IP Specification. In another embodiment of the invention, I/O adapter 304 operates in accordance with the Point-To-Point Protocol (PPP) as defined by the IETF Standard 51, RFC 1661, adopted in July 1994, and available from "www.ietf.org." In yet another embodiment of the invention, I/O adapter 304 may operate in accordance with various frame relay standards, such as the "Voice Over Frame Relay Implementation Agreement" as defined by the Frame Relay Forum (FRF) Standard 11, adopted in May 1997, Annex J Added March 1999, available from "www.frforum.com" ("FRF.11 Specification"). In another embodiment of the invention, I/O adapter 304 may operate in accordance with various VOIP standards, such as the "Packet Based Multimedia Communications Systems" as defined by the International Telecommunications Union Telecommunications (ITU-T) Recommendation H.323, adopted in February 1998, available from "www.itu.int" ("H.323 Specification"). In yet another embodiment of the invention, I/O adapter 304 may operate in accordance with "Real Time Protocol (RTP): A Transport Protocol For Real Time Applications" as defined by the IETF Proposed Standard, RFC 1889, published in January 1996, and available from "www.ietf.org" ("RTP Specification"). In another embodiment of the invention, I/O adapter 304 may operate in accordance with "SIP: Session Initiation Protocol" as defined by the IETF Proposed Standard, RFC 2543, published in March 1999, and available from "www.ictf.org" ("SIP Specification). These are just examples and many other protocols may be employed in alternating embodiments.

I/O adapter 304 also includes connectors for connecting I/O adapter 304 with a suitable communications medium. Those skilled in the art will understand that I/O adapter 304 may receive information signals over any suitable communication medium such as twisted-pair wire, co-axial cable, fiber optics, radio frequencies, and so forth.

Monitoring module 318 may comprise any hardware, firmware or software module, or combination thereof, to monitor a desired operating parameter for node 300. In one embodiment of the invention, monitoring module 318 may retrieve an operating parameter identifier from a packet. An operating parameter identifier in this context may comprise explicit priority information from a packet. The term "explicit" in this context may refer to a bit or byte that specifically identifies a priority level for a given packet or series of packets. An example of monitoring module 318 may be a protocol analyzer. A protocol analyzer may be designed to convert information signals into a form readable by node 300. The converted information may be analyzed to determine control information for a received packet. The control information may be used to determine a priority level for a received packet. For example, if a received packet comprises an IP packet, monitoring module 318 may determine the priority level for a packet by examining a Differential Services Code Point (DSCP) in the IP header for the packet in accordance with the TCP/IP Specification. If a received packet comprises an RTP packet, monitoring module 318 may examine a priority level identifier in the RTP header for the packet in accordance with the RTP Specification. If a packet comprises a Voice Over IP (VOIP) packet, monitoring module 318 may examine control information in VOIP packets to determine priority level in accordance with the H.323 Specification and SIP Specification. If a packet comprises a frame relay packet, monitoring module 318 may examine control information in frame relay packets to determine priority level in accordance with the FRF.11 Specification. These are just examples and other identifiers from many other protocols may be employed in alternating embodiments.

Alternatively, monitoring module 318 may determine an implicit priority level for one or more packets. The term "implicit" in this context may refer to identifying a priority level for a packet or series of packets using a set of rules or heuristics. One rule or heuristic may be based on packet length, for example. A rule may be created that if a packet length is relatively short such as, for example 500 bytes. In such circumstances, there is a reasonable likelihood that the packet is carrying time sensitive information and should be assigned a high priority level. Another rule or heuristic may be based on information in a packet, such as a telephone number. A rule may be created that if monitoring module 318 detects a telephone number within a packet, there may be a reasonable likelihood that the packet or subsequent packets may be carrying voice information and should be assigned a high priority level.

In another embodiment of the invention, monitoring module 318 may comprise a module to measure the connection speed of connection 324. Connection speed may be represented in terms of kilobits per second (kbps), for example.

Although monitoring module 318 has been illustrated as a module to retrieve priority information from a packet and connection speed, it can be appreciated that any type of monitoring module configured to retrieve any number of desired operating parameters may also be used and still fall within the scope of the invention.

Figure 4:
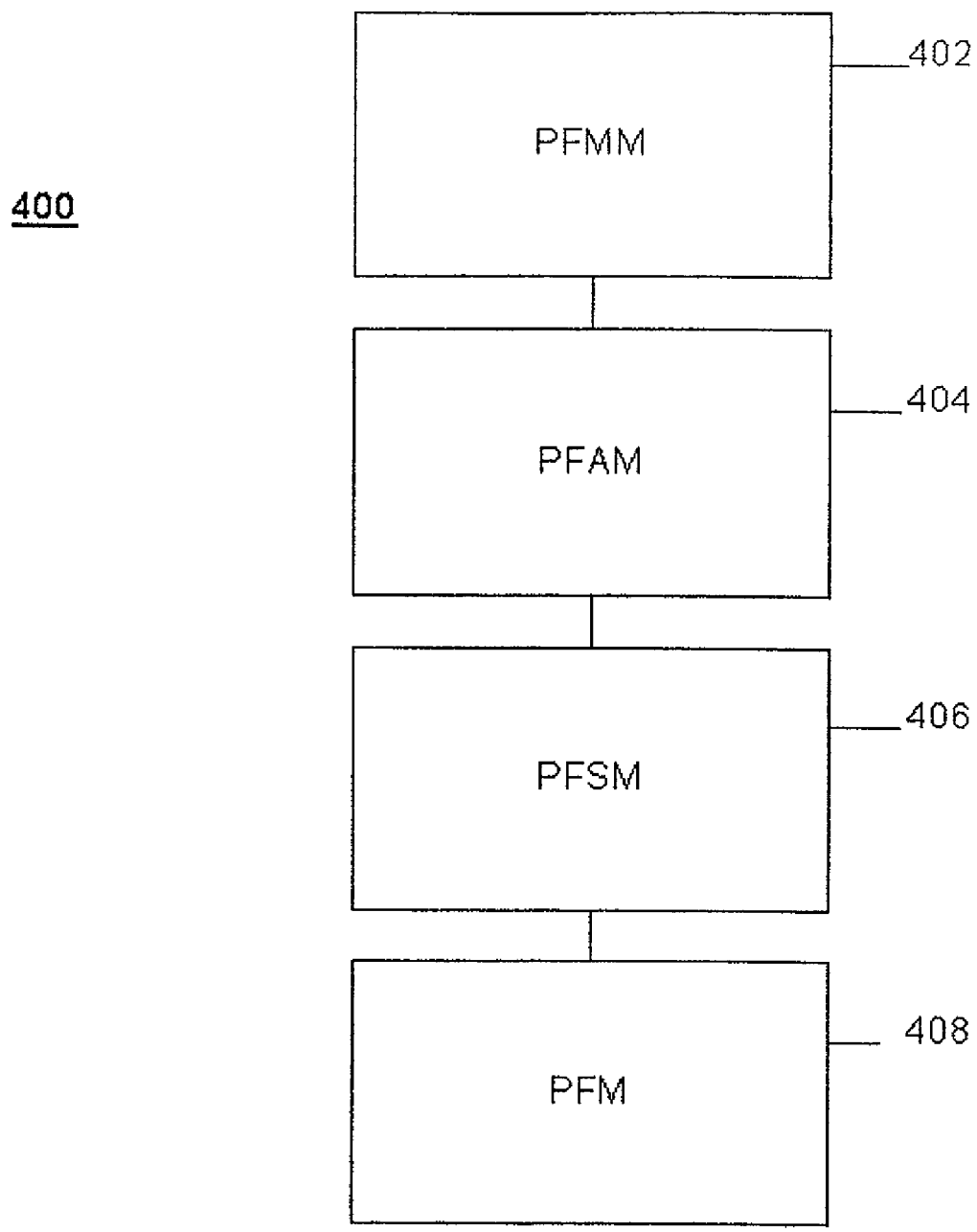
FIG. 4 is a block diagram of a program partition in accordance with one embodiment of the invention.

FIG. 4 is a block diagram of a program partition in accordance with one embodiment of the invention. FIG. 4 illustrates a program partition 400 that may be representative of program partition 312. In this embodiment, program partition 400 contains program instructions to manage packet fragmentation for an intermediate node, such as intermediate nodes 202 and 206. More particularly, this embodiment of the invention utilizes four sets of program instructions that will be collectively referred to herein as a packet fragmentation manager module (PFMM) 402, a packet fragmentation access module (PFAM) 404, a packet fragment size module (PFSM) 406 and a packet fragmentation module (PFM) 408, respectively. Of course, the scope of the invention is not limited to this particular set of instructions.

In this embodiment, PFMM 402 operates to manage packet fragmentation in general. PFMM 402 receives operating parameter information for one or more packets received over connection 324 from monitoring module 318. The term "operating parameter information" as used herein may include any desired information regarding an operating parameter. PFMM 402 routes the operating parameter information to PFAM 404 and/or PFSM 406. PFMM 402 also operates to interface with an OS, such as OS 316, and an operator interface, such as operator interface 306, to coordinate configuration of operating state, operating parameters, or any other configuration information that may be desired for PFAM 404, PFSM 406 and PFM 408. In another embodiment of the invention, the functionality described with reference to PFMM 402 may be implemented as part of PFAM 404, PFSM 406, PFM 408 or another program module as desired for a particular system.

PFM 408 operates to perform packet fragmentation for node 300. One embodiment of the invention performs packet fragmentation in accordance with the IETF Proposed Standard entitled "The Multi-Class Extension To Multi-Link PPP," RFC 2686, published September 1999, available from "www.ietf.orl." ("MCML Specification"). Another embodiment of the invention performs packet fragmentation in accordance with the "Frame Relay Fragmentation Implementation Agreement" as defined by FRF Standard 12, adopted in December 1997, available from "www.frforum.com" ("FRF.12 Specification"). Although the embodiments of the invention may use a packet fragmentation protocol as defined in the MCML Specification or the FRF.12 Specification, it can be appreciated that any packet fragmentation protocol may be used for PFM 408 and still fall within the scope of the invention.

Figure 5:
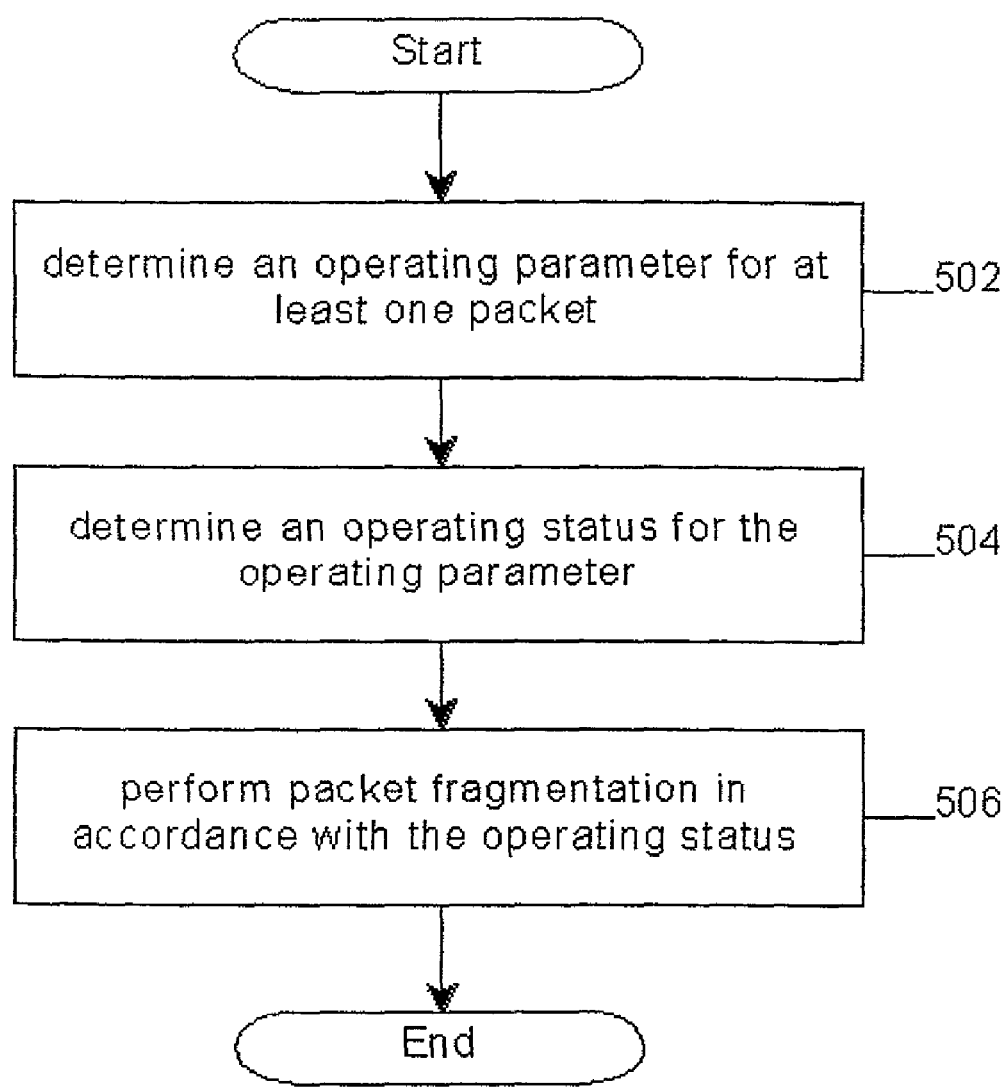
FIG. 5 is a block flow diagram of the processing logic performed by a packet fragmentation access module (PFAM) in accordance with one embodiment of the invention.
Figure 6:
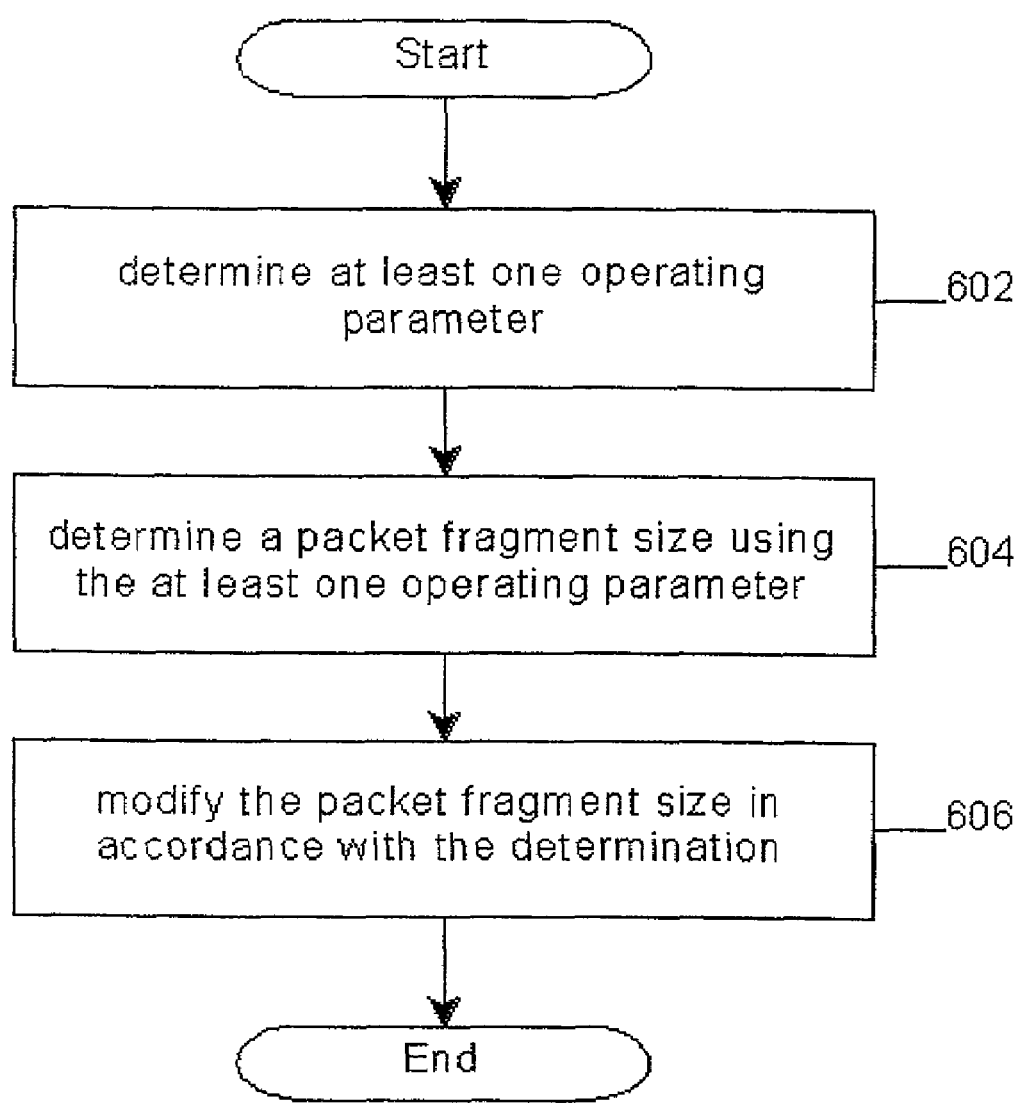
FIG. 6 is a block flow diagram of the processing logic for a packet fragmentation size module (PFSM) in accordance with one embodiment of the invention.

The operations of system 100, PFMM 402, PFAM 404, PFSM 406 and PFM 408 may be further described with reference to FIGS. 5 and 6 and accompanying examples. Although FIGS. 5 and 6 presented herein may include a particular processing logic, it can be appreciated that the processing logic merely provides an example of how the general functionality described herein can be implemented. Further, each operation within a given processing logic does not necessarily have to be executed in the order presented unless otherwise indicated.

FIG. 5 is a block flow diagram of the processing logic performed by a packet fragmentation access module (PFAM) in accordance with one embodiment of the invention. An operating parameter for at least one packet may be determined at block 502. An operating status for the operating parameter may be determined at block 504. Packet fragmentation may be performed substantially in accordance with the operating status at block 506.

In one embodiment of the invention, the operating parameter may be a priority level as defined by a priority scheme. The term "priority scheme" in this context may refer to any technique for separating information into different classes of information, and ranking each class in accordance with one or more criteria. Examples of some criteria may be class of service, quality of service (QoS), sensitivity to time delays, cost of service, source node, destination node, information type and so forth. The term "information type" in this context may refer to data from a voice conversation, videoconference, streaming video, email message, voice mail message, graphics, image, video, text and so forth. The term "priority level" in this context refers to an identifier for each class that may indicate its rank. Examples of priority levels may be high priority level, medium priority level, low priority level and so forth. A priority scheme may have any number of priority levels, and may define each priority level using any number or type of criteria.

In one embodiment of the invention, a priority scheme is used that classifies information according to time sensitive information and non-time sensitive information. Time sensitive in this context may refer to any information where it is desirable that it be delivered to a destination node within a certain time period. Examples of time sensitive information may include information from a voice conversation, videoconference, and streaming video. Non-time sensitive information in this context may refer to any other type of information. In one embodiment of the invention, time sensitive information may be assigned a priority level of high, and non-time sensitive information may be assigned a priority level of low, although this is just an example.

Although particular priority schemes and priority levels have been described in one or more embodiments of the invention, it can be appreciated that any number of priority schemes and priority levels may be used and still fall within the scope of the invention.

In one embodiment of the invention, the operating status may be one of active and de-active. If the priority level is high, the operating status may be determined to be active at block 504. If the priority level is low, the operating status may be determined to be de-active at block 504. The term "active" as used herein may refer to activating or turning on packet fragmentation functionality. The term "de-active" as used herein may refer to de-activating or turning off packet fragment functionality.

In one embodiment of the invention, operating status may be determined by evaluating whether the operating parameter has been determined within a limited time period. Operating status is determined in accordance with the evaluation. In one embodiment of the invention, the operating parameter may be determined to be a high priority level. If the high priority level was not determined within the limited time period, the operating status may be determined to be de-active.

In one embodiment of the invention, the operating status may be determined by searching a memory using the operating parameter. The memory may comprise, for example, memory 310. The operating status may be determined using an operating status associated with the operating parameter in memory.

In one embodiment of the invention, the operating parameter may be determined by receiving a packet with an operating parameter identifier. If there is no operating parameter identifier, an operating parameter may be inferred using one or more rules or heuristics as discussed above. The operating parameter identifier may be retrieved from the packet. In one embodiment of the invention, the operating parameter identifier may represent a priority level. More particularly, the operating parameter identifier may be one of a group comprising a DSCP, an RTP identifier, a VOIP identifier and a voice information identifier. The term "voice information identifier" as used herein may refer to any explicit identification that a packet may carry voice and/or video information.

The operation of system 100 and the processing logic described with reference to FIG. 5 may be better understood by way of example. It can be appreciated in the examples given below, however, that the priority levels, definitions for priority levels, operating parameters, operating status, time periods, assumptions and other values or parameters may be illustrative in nature and are not meant to limit the scope of the invention herein.

In this embodiment, PFAM 404 manages packet fragmentation for system 100. PFAM 404 may operate to automatically change an operating status for packet fragmentation based on, at least in part, one or more operating parameters. In one embodiment of the invention, PFAM 404 may receive operating parameter information in the form of level of priority for one or more received packets. PFAM 404 manages the operating status of PFM 408. PFAM 404 has access to a data partition, such as data partition 314. The data partition may include a table having an operating status associated with each level of priority for a given priority scheme. The operating status may be, for example, active or de-active. An example of a table that may be used in accordance with one embodiment of the invention is shown below as Table 1. It can be appreciated that any of the tables used herein is for illustrative purposes only, and that the embodiments of the invention may not store the relevant information in precisely the same form as given herein.

TABLE 1

| Priority Level | Time Period | Operating Status |
| --- | --- | --- |
| High Priority Level | 0 seconds | Active |
| Low Priority Level | 30 seconds | De-Active |

As shown in Table 1, two priority levels are defined: high and low. The high priority level may include any information that may tolerate, for example, 4 ms of delay per intermediate node. Examples of high priority level information may include information from voice conversations, video conferencing and real-time streaming video from a video or image file. The low priority level may include any other type of information other than high priority level information, such as voice messages or email messages. It can be appreciated, however, that any type of desired priority scheme may be utilized and still fall within the scope of the invention.

Each priority level may be assigned a time period value, which may represent a time period in which packets of a given priority level may be received prior to changing operating status. The time period may be useful to ensure that PFM 408 does not constantly switch operating status from "active" to "de-active" unnecessarily. For example, the time period for low priority packets in this example is set for 30 seconds. This may help ensure that PFM 408 does not change its current operating status unnecessarily in response to, for example, the insertion of a low priority level packet within a stream of high priority level packets. In other words, the time period for receiving low priority level packets helps improve the possibility that PFM 408 may change its operating status to "de-active" without missing high priority level packets. If the operating status for PFM 408 is currently active, and a series of low priority level packets are received without any high priority level packets for more than the given time period of 30 seconds, then PFAM 404 may retrieve the associated operating status, which in this example is "de-active." PFAM 404 may send a signal to PFM 408 indicating PFM 408 may change its current operating status to the new operating status of "de-active." Stated another way, if the operating status for PFM 408 is currently active, and no high priority level packets are received within 30 seconds, then PFAM 404 may retrieve the associated operating status for the low priority level which is "de-active." PFAM 404 may send a signal to PFM 408 indicating PFM 408 may change its current operating status to the new operating status of "de-active."

In another example, the time period for high priority level is set to 0 seconds. This means that PFAM 404 of node 300 may not wait a given time period to receive high priority level packets prior to changing operating status. Rather, PFAM 404 may change an operating status for PFM 408 from "de-active" to "active" upon receipt of any high priority level packet. This may be desirable to ensure that once a high priority level packet is received by node 300, that PFM 408 may change its operating status to an "active" operating status to reduce the possibility of delaying any high level packets. If the operating status for PFM 408 is currently "de-active," and if any high priority level packet is received, then PFAM 404 may retrieve the associated operating status for the high priority level which is "active." PFAM 404 sends a signal to PFM 408 indicating PFM 408 should change its current operating status to the new operating status of "active."

In another embodiment of the invention, PFAM 404 may manage packet fragmentation according to one or more schedule parameters. The term "schedule parameter" in this context may refer to a time, a date or time and date, for example. A data partition, such as data partition 314, may include a table having an operating status associated with one or more schedule parameters. The operating status may be, for example, active or de-active. An example of a table that may be used in accordance with one embodiment of the invention is shown below as Table 2.

TABLE 2

| Date | Time | Operating Status |
| --- | --- | --- |
| Dec. 1, 2000 | 8:00 am | Active |
| Dec. 1, 2000 | 8:00 pm | De-Active |
| Dec. 2, 2000 | 8:00 am | Active |

In this embodiment of the invention, Table 2 may include, for example a schedule parameter comprising a time and date, and an operating status associated with the time and date. The operating status may comprise, for example, active and de-active. In this embodiment of the invention, PFAM 404 may manage packet fragmentation by changing the operating status for PFM 406 according to the scheduled time and date. In the above example, PFAM 404 may access Table 2 to retrieve one or more scheduled times and dates along with associated operating status. PFAM 404 may receive signals from a module designed to maintain a current date and time, such as scheduling module 320. PFAM 404 compares the received signals with the retrieved time and date. If the comparison results in a match, PFAM 404 sends a signal to PFM 406 with the new operating status. For example, PFAM 404 may retrieve a time and date of 8:00 am and Dec. 1, 2000, respectively, and the associated operating status of "active." PFAM 404 receives signals from scheduling module 320. Once PFAM 404 receives a signal representing a time of 8:00 am on Dec. 1, 2000, PFAM 404 sends a signal to PFM 406 to change its current operating status to "active." This same or similar process may continue with the next row until all rows have been processed. If desired, PFAM 404 may be configured to begin with the first row in Table 2 once the last row of Table 2 is reached. PFAM 404 may also be configured to repeat certain rows on a recurring basis.

This embodiment of the invention may be desirable, for example, when an intermediate node or system may assume that a certain type of information may be received at different times or dates. For example, a system administrator may anticipate receiving high priority information between the hours of 8:00 am and 8:00 pm every day, and low priority information between the hours of 8:00 pm and 8:00 am every night. This may occur, for example, because all information from emails and voice mails are processed and communicated together in bulk during the evening hours when the system or intermediate node is less frequently utilized. This schedule may be implemented in the form of Table 2, and PFAM 404 may use Table 2 to change operating status accordingly.

It can be appreciated that any number of times or dates may be used with Table 2 and PFAM 404 and still fall within the scope of the invention. Furthermore, it can be appreciated that Table 2 and PFAM 404 may utilize a time, a date or a time and date, and still fall within the scope of the invention.

FIG. 6 is a block flow diagram of the processing logic for a packet fragmentation size module (PFSM) in accordance with one embodiment of the invention. At least one operating parameter may be determined at block 602. A packet fragment size may be determined using the at least one operating parameter at block 604. The packet fragment size may be modified substantially in accordance with the determination of block 604 at block 606.

In one embodiment of the invention, the operating parameter may comprise a connection speed. In this embodiment of the invention, the packet fragment size may increase as the connection speed increases. Conversely, the packet fragment size may decrease as the connection speed decreases.

In one embodiment of the invention, the operating parameter may comprise a priority level. In this embodiment of the invention, the packet fragment size may decrease as the priority level increases. Conversely, the packet fragment size may increase as the priority level decreases.

In one embodiment of the invention, the determination at block 604 may be performed as follows. Whether the operating parameter has been determined within a time period is evaluated. The packet fragment size may be determined substantially in accordance with the evaluation. In one embodiment of the invention, the operating parameter may be a high priority level, and if the high priority level was not determined within the time period, a new packet fragment size may be determined and used to modify packet fragmentation. In one embodiment of the invention, the operating parameter is a low priority level, and if the low priority level was determined within the time period, a new packet fragment size may be determined and used to modify packet fragmentation.

In one embodiment of the invention, the at least one operating parameter comprises a connection speed and priority level. In this embodiment of the invention, the packet fragment size increases within a priority level as the connection speed increases. Conversely, the packet fragment size decreases within a priority level as the connection speed decreases. The determination at block 604 described above may also be utilized with this embodiment of the invention with respect to priority levels determined within a time period.

In one embodiment of the invention, the determination at block 606 may be performed as follows. A memory is searched using the at least one operating parameter. A packet fragment size associated with the at least one operating parameter is retrieved.

The operation of system 100 and the processing logic described with reference to FIG. 6 may be better understood by way of example. It can be appreciated in the examples given below, however, that the priority levels, definitions for priority levels, operating parameters, operating status and time periods are illustrative in nature and are not meant to limit the scope of the invention herein.

PFSM 406 operates to automatically modify packet fragment size based on one or more operating parameters. In one embodiment of the invention, PFSM 406 receives operating parameter information in the form of connection speed for a connection, such as connection 324, and priority level for one or more received packets. PFSM 406 manages the packet fragment size for PFM 408. PFSM 406 has access to a data partition, such as data partition 314. The data partition may comprise a table having a packet fragment size value associated with each level of priority for a given priority scheme and each level of connection speed. An example of a table that may be used in accordance with one embodiment of the invention is shown below as Table 3.

TABLE 3

| Priority Level | Time Period | Connection Speed | Packet Fragment Size |
|---|---|---|---|
| High Priority Level | 0 seconds | 64 kbps | 32 bytes |
| High Priority Level | 0 seconds | 128 kbps | 64 bytes |
| High Priority Level | 0 seconds | 2 mbps | 1000 bytes |
| Low Priority Level | 30 seconds | 64 kbps | 64 bytes |
| Low Priority Level | 30 seconds | 128 kbps | 128 bytes |
| Low Priority Level | 30 seconds | 2 mbps | 2000 bytes |

As shown in Table 3, PFSM 406 may receive as input information such as a priority level and a connection speed. PFSM 406 may use the input information to search Table 3 and retrieve a time period value to determine whether to retrieve the appropriate operating status for PFM 408. Using the priority definitions described with reference to Table 1, a high priority level may include any information that may tolerate, for example, 5 ms of delay per intermediate node. In this example, packet fragment sizes for high priority level packets would vary according to connection speed. For a given delay boundary of approximately 5 ms, for example, a connection speed of 64 kbps may set a packet fragment size of 32 bytes. Transmission time for a packet fragment of 32 bytes at 64 kbps would take approximately 4.25 ms, which may be tolerable for the given priority level. As the connection speed increases, the same 5 ms of delay may be incurred using a larger packet fragment size. For example, a connection speed of 128 kbps may set a packet fragment size of 64 bytes. Transmission time for a packet fragment of 64 bytes at 128 kbps would take approximately 4.25 ms, which also may be tolerable for the given priority level.

Lower priority level packets may by definition tolerate a longer period of delay. Therefore, operating status for PFM 408 may be set to "de-active" as per previous embodiments of the invention. There may be conditions that may occur, however, that make it desirable to perform packet fragmentation for lower priority level packets. For example, the priority scheme may define low priority level packets by a time boundary, such as packets carrying information that may tolerate a delay of 9 ms or less. In this case, it may be desirable to maintain the operating status of PFM 408 as "active" but increase packet fragment size to take advantage of the faster connection speeds. Therefore, if PFSM 406 were to receive a low priority level as input information for the given time period of 30 seconds, and a connection speed of 64 kbps, then the packet fragment size for PFM 408 may be set to 64 bytes. Transmission ti me for a packet fragment of 64 bytes at a 64 kbps would be approximately 8.5 ms, which may be tolerable for the given priority level. As the connection speed increases, the same 9 ms of delay may be incurred using a larger packet fragment size. For example, a connection speed of 128 kbps may set a packet fragment size of 128 bytes. Transmission time for a packet fragment of 128 bytes at 128 kbps would take approximately 8.5 ms, which also may be tolerable for the given priority level. Consequently, once PFSM 406 receives a priority level for one or more received packets and a connection speed for connection 324, it retrieves the appropriate packet fragment size value. Accordingly, PFSM 406 sends a signal to PFM 408 indicating PFM 408 should change its current packet fragment size value with the new packet fragment size value.

In another embodiment of the invention, a single operating parameter such as connection speed may be used to determine packet fragment size. An example of a table that may be used in accordance with this embodiment of the invention is shown below as Table 4.

TABLE 4

| Connection Speed | Packet Fragment Size |
| --- | --- |
| 64 kbps | 32 bytes |
| 128 kbps | 64 bytes |
| 2 mbps | 1000 bytes |

As shown in Table 4, a packet fragment size is associated with a given connection speed. PFSM 406 may receive only a connection speed as input information to determine packet fragment size for PFM 408. Once the connection speed has been determined or received, PFSM 406 searches Table 3 to find the appropriate packet fragment size. For example, if PFSM 406 were to receive a connection speed of 64 kbps as an input, PFSM 406 would search Table 3 using the value 64 kbps. Once the appropriate connection speed was found in Table 3, PFSM 406 could retrieve the packet fragment size value associated with the connection speed, which in this example may be 32 bytes.

This embodiment of the invention may be desirable in those systems that assume an upper boundary for time delays for all information received, and uses that upper boundary to determine an appropriate packet fragment size for a given connection speed. For example, Table 4 may be appropriate for an intermediate node that anticipates carrying only voice information, and therefore may only tolerate 4 ms worth of delay for any packet communicated by the intermediate node. Given this upper boundary, PFSM 406 may utilize Table 4 to vary packet fragment size with the assumption that the packet fragment size at any given connection speed may not result in a delay of more than 4 ms.

In another embodiment of the invention, a single operating parameter such as priority level may be used to determine packet fragment size. An example of a table that may be used in accordance with this embodiment of the invention is shown below as Table 5.

TABLE 5

| Priority Level | Time Period | Packet Fragment Size |
| --- | --- | --- |
| High Priority Level | 0 seconds | 32 bytes |
| Low Priority Level | 30 seconds | 64 bytes |

As shown in Table 5, a packet fragment size is associated with a given priority level. PFSM 406 may receive only a priority level as input information to determine packet fragment size for PFM 408. Once the priority level has been determined or received, PFSM 406 searches Table 5 to find the appropriate packet fragment size. For example, if PFSM 406 were to receive a high priority level as an input, PFSM 406 would search Table 5 by high priority level. Once the appropriate priority level was found in Table 5, PFSM 406 may retrieve the packet fragment size value associated with the priority level, which in this example may be 32 bytes.

This embodiment of the invention may be desirable in those systems that may have a reasonably reliable constant or average connection speed, and may use that average connection speed to determine an appropriate packet fragment size for a given priority level. For example, Table 5 may be appropriate for an intermediate node that anticipates an average connection speed of 64 kbps, and defines a high priority level as any packet carrying information that can tolerate 4 ms of delay or less, and a low priority level as any packet carrying information that can tolerate more than 4 ms of delay. Given this average connection speed and priority level definitions, PFSM 406 may utilize Table 5 to vary packet fragment size with the assumption that the packet fragment size at any given priority level will meet the priority level definitions if the average connection speed is as assumed.

Figure 7:
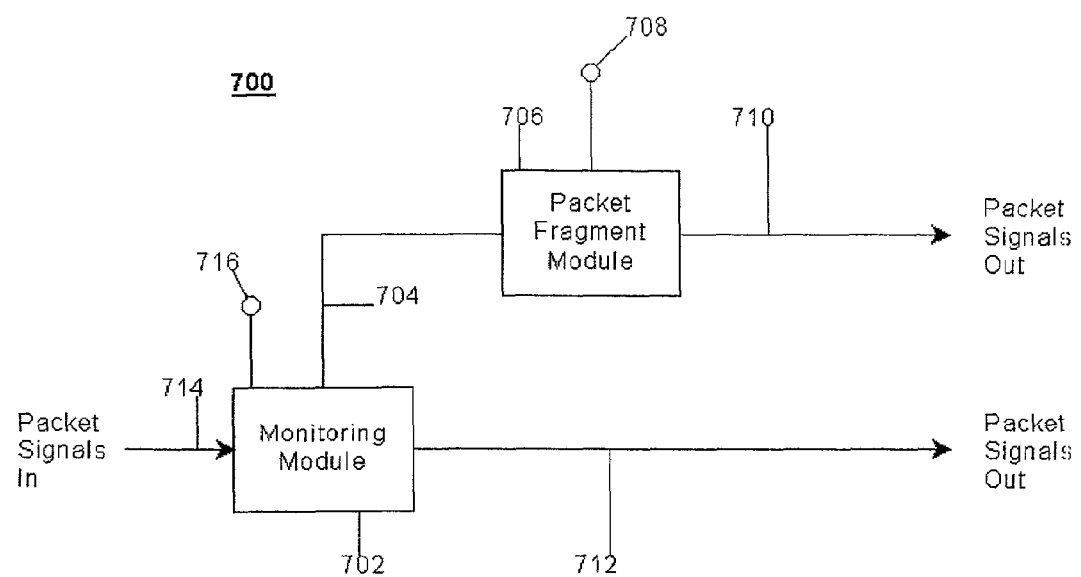
FIG. 7 is a block flow diagram of an intermediate node in accordance with another embodiment of the invention.

FIG. 7 is a block diagram of an intermediate node in accordance with another embodiment of the invention. FIG. 7 illustrates an intermediate node 700 that may be representative of intermediate nodes 202 and 206. Intermediate node 700 comprises a monitoring module 702 connected to a packet fragmentation module (PFM) 706 over a connection 704. PFM 706 may receive input signals from connection 704 and input port 708, and send output signals representative of packet signals over connection 710. Monitoring module 702 may receive input signals representing packet input signals over connection 714, input signals from input port 716, and send output signals representative of packet signals over connection 712.

Intermediate node 700 sets up two potential processing paths for received packets. The first processing path bypasses packet fragmentation and continues conventional processing operations for an intermediate node as it prepares to transmit the packets to another node. The second processing path may perform packet fragmentation and then forward packets or packet fragments for conventional processing operations, depending on the configuration of the PFM, such as PFM 706.

Monitoring module 702 is similar to monitoring module 318 described with reference to FIG. 3. Monitoring module 702 may also be configured to route certain incoming packet signals to PFM 706 for packet fragmentation, while routing other incoming packet signals over connection 712 thereby bypassing PFM 706. In one embodiment of the invention, monitoring module 702 determines which incoming packet signals to route to PFM 706 over connection 704, and which incoming packet signals to route over connection 712, in accordance with signals received from input 716. Signals received from input port 716 may be, for example, from a PFMM, PFAM or PFSM, such as PFMM 402, PFAM 404 and PFSM 406, respectively. For example, PFMM 402 may send signals to monitoring module 702 to route all high priority packets over connection 712, and all low priority packets over connection 704 to PFM 706. This may be desirable, for example, when high priority packets represent time sensitive information, such as information from a voice conversation, videoconference or streaming video. Time sensitive information is typically communicated using packets of shorter length to reduce potential delays in the network. Consequently, there may be a desire to avoid or reduce the incidence of fragmenting high priority packets since packet fragmenting typically introduces additional overhead in the form of packet fragment headers. As a result, monitoring module 702 may be configured to determine a priority level for a packet, and route high priority packets over connection 712 to bypass packet fragmentation as performed by PFM 706.

On the other hand, it may be desirable to route incoming packet signals representing lower priority packets to PFM 706 to reduce delay for higher priority packets, using one or more of the embodiments of the invention described above. In this case, monitoring module 702 may be configured to determine a priority level for a packet, and route low priority packets over connection 704 to PFM 706. PFM 706 may be similar to PFM 408 described with reference to FIG. 4. PFM 706 may receive input signals from input port 708. The input signals from input port 708 may be signals from, for example, a PFMM, PFAM or PFSM, such as PFMM 402, PFAM 404 and PFSM 406, respectively. For example, PFM 706 may receive input signals from PFAM 404 to change an operating status for PFM 706 between active and de-active in accordance with the processing logic described with reference to FIG. 5 and accompanying examples. In another example, PFM 706 may receive input signals from PFSM 406 to change a packet fragment size in accordance with the processing logic described with reference to FIG. 6 and accompanying examples.

In another embodiment of the invention, monitoring module 702 may be configured via signals from input port 716 to route low priority packets over connection 712 to bypass PFM 706. This may reduce the need to manage packet fragmentation at PFM 706 via inputs from input port 708.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to manage packet fragmentation, comprising:
   determining an operating parameter for a packet, with said operating parameter to represent a priority level;
   determining an operating status to be set in accordance with said operating parameter, with said operating status to comprise active or de-active;
   performing packet fragmentation substantially in accordance with said operating status; and
   evaluating whether said operating parameter has been determined within a limited time period.

2. The method of claim 1, wherein said priority level is high and said operating status is active.

3. The method of claim 1, wherein said priority level is low and said operating status is de-active.

4. The method of claim 1, wherein said determining an operating status for said operating parameter, comprises:
   determining said operating status substantially in accordance with said evaluation.

5. The method of claim 4, wherein said operating parameter is a high priority level, said high priority level was determined within said time period, and said operating status is active.

6. The method of claim 4, wherein said operating parameter is a low priority level, said low priority level having been determined within said time period, and said operating status is de-active.

7. A method to manage packet fragmentation, comprising:
   determining an operating parameter for a packet;
   determining an operating status to be set in accordance with said operating parameter, with said operating status to comprise active or de-active;
   performing packet fragmentation substantially in accordance with said operating status;
   evaluating whether said operating parameter has been determined within a limited time period; and
   wherein said determining an operating parameter comprises:
      receiving said packet with an operating parameter identifier; and
      retrieving said operating parameter identifier from said packet.

8. The method of claim 7, wherein said operating parameter identifier represents a priority level for said packet.

9. The method of claim 8, wherein said operating parameter identifier comprises an operating parameter identifier to comprise a differential services code byte, a real time protocol identifier, a voice over Internet Protocol identifier or a voice information identifier.

10. A method to manage packet fragmentation, comprising:
    determining an operating parameter for a packet, wherein said operating parameter comprises an operating parameter identifier to comprise a time, a date or a time and date;
    determining an operating status to be set in accordance with said operating parameter, with said operating status to comprise active or de-active;
    performing packet fragmentation substantially in accordance with said operating status; and
    evaluating whether said operating parameter has been determined within a limited time period.

11. The method of claim 10, wherein determining an operating parameter comprises:
    searching for said operating parameter; and
    retrieving said operating status associated with said retrieved operating parameter.

12. An article comprising:
    a storage medium;
    said storage medium including stored instructions that, when executed by a processor, result in determining an operating parameter for at least one packet, determining an operating status to be set in accordance with said operating parameter, performing packet fragmentation substantially in accordance with said operating status by setting said operating status to activate packet fragmentation, and wherein said determining said operating status is performed by evaluating whether said operating parameter has been determined within a limited time period.

13. An article comprising:
a storage medium;
said storage medium including stored instructions that, when executed by a processor, result in determining an operating parameter for at least one packet, determining an operating status to be set in accordance with said operating parameter, performing packet fragmentation substantially in accordance with said operating status by setting said operating status to deactivate packet fragmentation, and wherein said determining said operating status is performed by evaluating whether said operating parameter has been determined within a limited time period.

14. An article comprising:
a storage medium;
said storage medium including stored instructions that, when executed by a processor, result in determining an operating parameter for at least one packet, determining an operating status to be set in accordance with said operating parameter, performing packet fragmentation substantially in accordance with said operating status, and wherein said determining said operating status is performed by evaluating whether said operating parameter has been determined within a limited time period, and determining said operating status substantially in accordance with said evaluation.

15. A system comprising:
a computer platform to manage packet fragmentation;
said platform to determine an operating parameter for at least one packet, determine an operating status to be set in accordance with said operating parameter, perform packet fragmentation substantially in accordance with said operating status, to determine said operating status by evaluating whether said operating parameter has been determined within a limited time period, and to set an operating status to activate packet fragmentation.

16. A system comprising:
a computer platform to manage packet fragmentation;
said platform to determine an operating parameter for at least one packet, determine an operating status to be set in accordance with said operating parameter, perform packet fragmentation substantially in accordance with said operating status, to determine said operating status by evaluating whether said operating parameter has been determined within a limited time period, and to set an operating status to deactivate packet fragmentation.

17. A system comprising:
a computer platform to manage packet fragmentation;
said platform to determine an operating parameter for at least one packet, determine an operating status to be set in accordance with said operating parameter, perform packet fragmentation substantially in accordance with said operating status, to determine said operating status by evaluating whether said operating parameter has been determined within a limited time period, and to determine said operating status substantially in accordance with said evaluation.

18. A method to perform packet fragmentation, comprising:
determining an operating parameter for a packet;
determining a packet fragment size using said operating parameter;
performing packet fragmentation for said packet using said packet fragment size, wherein said operating parameter comprises a priority level; and
evaluating whether said operating parameter has been determined within a limited time period.

19. The method of claim 18, wherein said packet fragment size decreases as said priority level increases.

20. The method of claim 18, wherein said packet fragment size increases as said priority level decreases.

21. The method of claim 18, wherein said determining comprises:
determining said packet fragment size substantially in accordance with said evaluation.

22. A method to perform packet fragmentation, comprising:
determining an operating parameter for a packet;
determining a packet fragment size using said operating parameter;
performing packet fragmentation for said packet using said packet fragment size, wherein said at least one operating parameter comprises a connection speed and priority level; and
evaluating whether said operating parameter has been determined within a limited time period.

23. The method of claim 22, wherein said packet fragment size increases within a priority level as said connection speed increases.

24. The method of claim 22, wherein said packet fragment size decreases within a priority level as said connection speed decreases.

25. The method of claim 22, wherein said determining said packet fragment size comprises:
determining said packet fragment size in accordance with said evaluation.

26. The method of claim 25, wherein said operating parameter is a high priority level, said high priority level was determined within said time period, and said operating status is active.

27. The method of claim 25, wherein said operating parameter is a low priority level, said low priority level having been determined within said time period, and said operating status is de-active.

28. A method, comprising:
determining an operating parameter for a packet;
determining a packet fragment size using said operating parameter;
performing packet fragmentation for said packet using said packet fragment size,
wherein said operating parameter comprises a priority level; and
wherein said packet fragment size decreases as said priority level increases;
wherein said determining comprises evaluating whether said operating parameter has been determined within a limited time period, and determining said packet fragment size substantially in accordance with said evaluation.

29. A method, comprising:
determining an operating parameter for a packet;
determining a packet fragment size using said operating parameter;
performing packet fragmentation for said packet using said packet fragment size,
wherein said operating parameter comprises a priority level; and
wherein said packet fragment size increases as said priority level decreases;
wherein said determining comprises evaluating whether said operating parameter has been determined within a limited time period, and determining said packet fragment size substantially in accordance with said evaluation.

* * * * *